May 24, 1949.  J. GAUCI ET AL  2,470,812
MACHINE FOR ASSEMBLING SPRINGS
Filed May 28, 1946  6 Sheets-Sheet 4

INVENTORS
*Joseph Gauci*
BY *Daniel Krakauer*

*Harry Jacobson*
ATTORNEY

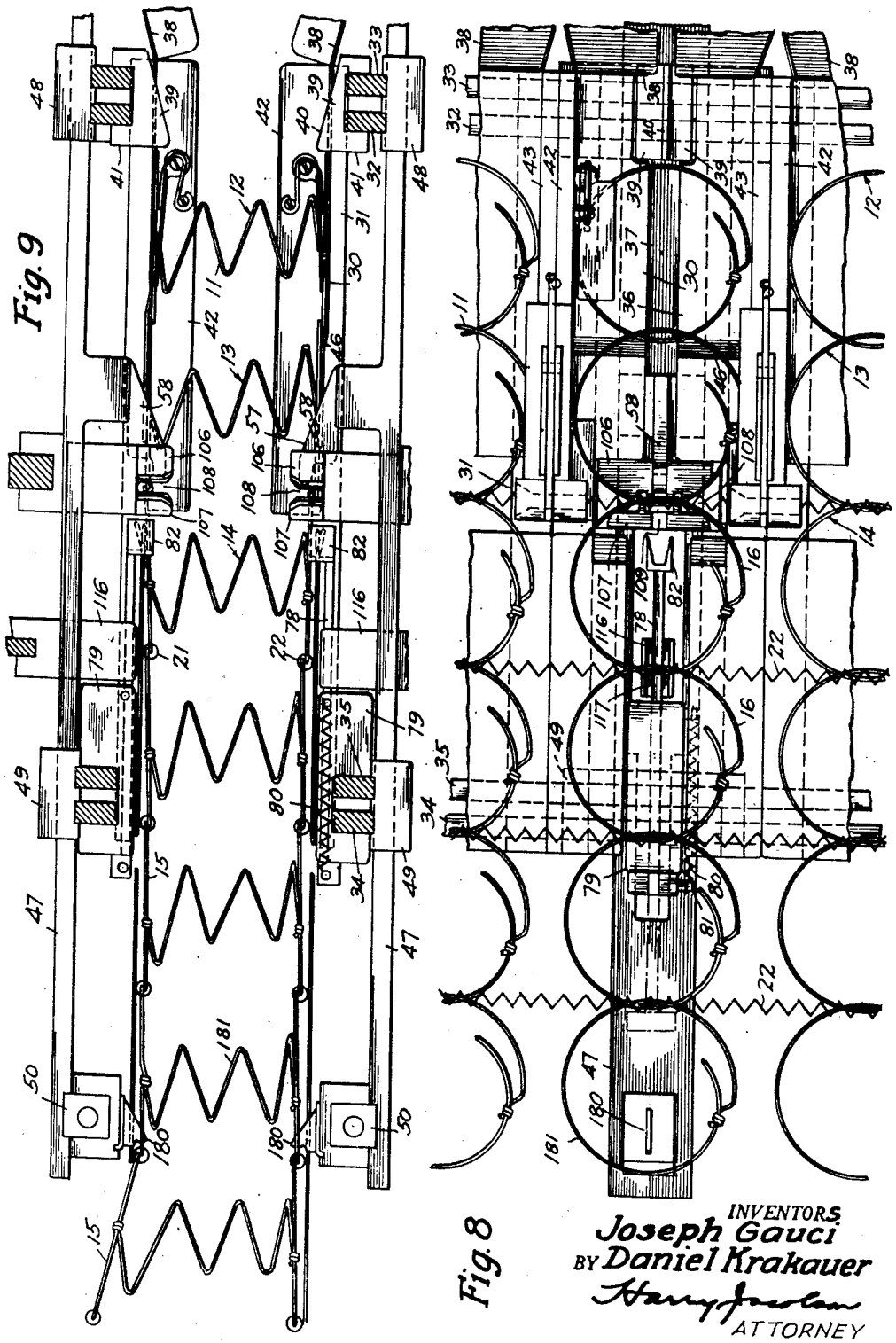

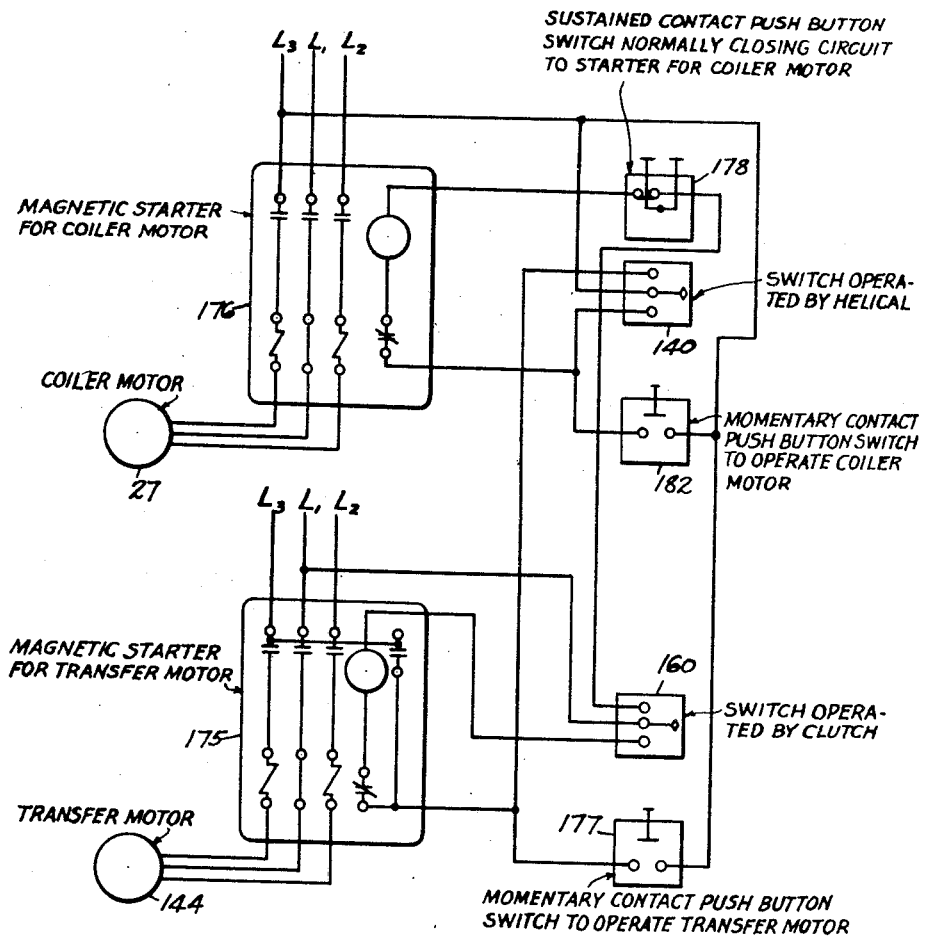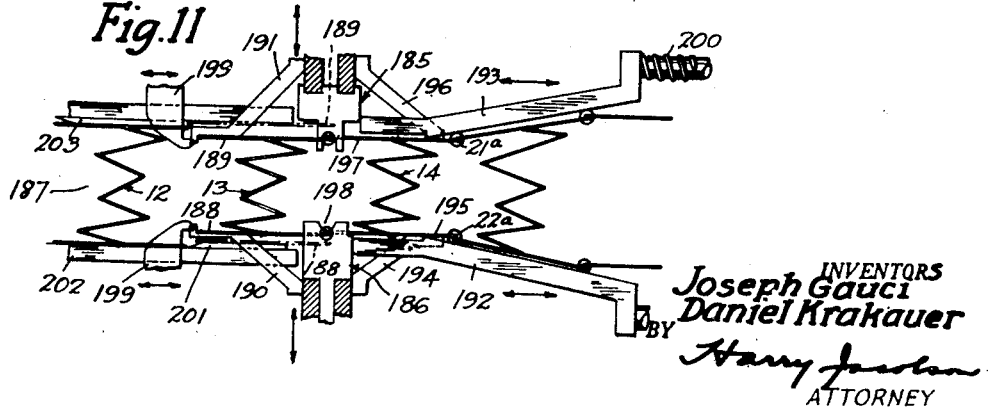

Patented May 24, 1949

2,470,812

UNITED STATES PATENT OFFICE 2,470,812

MACHINE FOR ASSEMBLING SPRINGS

Joseph Gauci and Daniel Krakauer, Brooklyn, N. Y., assignor to Kay Manufacturing Corporation, Brooklyn, N. Y., a corporation of New York Application May 28, 1946, Serial No. 672,754

19 Claims. (Cl. 140—3)

This invention relates to machines for assembling and tying coil springs in rows to form resilient inner spring units such as are used in the interior of cushions, mattresses and the like.

In such units, helical tie wires are interengaged respectively with the upper and lower coils of adjacent rows of coil springs to form the assembly. Machines which have heretofore been devised for making such assemblies are either manually operated to an undue extent, thereby requiring skilled operators and saving little labor in the manufacture of the assemblies, or at the other extreme the machines are designed for fully automatic operation and hence are necessarily so elaborate that many sources of maladjustment and failure are inevitably present therein and dependable and continuous operation without interruption at the full capacity of the machine is difficult of attainment.

The present invention contemplates the provision of a relatively simple and dependable machine of the one-cycle or one-revolution type for forming and tying the helical tie wires around the adjacent prearranged rows of coil springs, severing the wires at the proper time and advancing the tied rows together with another row fed to the machine ready for the repetition of the cycle, the machine stopping automatically at the end of the cycle so that all the operator need to do is start the machine after the row of coil springs has been fed thereto.

The invention further contemplates the provision of means for aligning and maintaining the upper and lower end coils of the coil springs in adjacent rows in an accurately predetermined position with due allowance for tolerances or variations in the theoretical shapes and sizes of the individual coil springs as manufactured, whereby the helicals formed by the machine cannot fail to be rotated and advanced without interruption into the exact theoretical row-tying positions thereof around the adjacent end coils of the aligned coil springs. We have found that by accurately positioning and holding the rows of springs to be tied, dependable operation of the machine is attainable without the necessity for the addition of any extraordinary precautionary mechanism of the automatic or manually controllable types.

The invention further contemplates the provision of simple means for controlling the formation and feed of the helical tie wire, so that such wire may be omitted when desired, as at the beginning of a unit assembly, or at the end of such assembly or both.

The invention further contemplates the provision of means for advancing and for controlling the advance of the tied rows of coil springs while simultaneously advancing the succeeding row of springs to be tied into a position in which the springs of said succeeding row are approximately aligned with each other and held by suitable mechanism, whereafter said springs are aligned with the utmost required accuracy ready to be tied by the helical tie wires.

The invention further contemplates the provision of a comparatively simple but highly efficient and dependable machine for the purposes intended, which machine may easily be adapted for the automatic feeding of springs thereto and thereby adapted for completely automatic operation without material changes in the machine, or which may readily be adapted with immaterial changes for the manual prearrangement of a row of springs to be fed as a unit into the machine at the proper time.

The various objects of the invention will clear from the description which follows and from the drawings, in which Fig. 1 is a fragmentary front elevational view of the machine, with part of the machine frame and certain fixed supports in section, showing a single unit and part of another for positioning the coil springs and the helicals, it being understood that an additional number of substantially identical units are employed but are not shown, and that said number is determined by the number of coil springs in a row of the assembled spring unit.

Fig. 7 is a fragmentary top plan view of one of the cutters for severing the helicals.

Fig. 8 is a fragmentary top plan view of the lower portion of one of the spring guideways and spring positioning and advancing units, showing a slightly modified form of the member which aids in controlling the advance of the rows.

Fig. 9 is a vertical sectional view of a modified form of one of the units similar to Fig. 3 but showing the upper and the lower portions of the unit as substantially identical.

Fig. 10 is a diagram of the electrical connections to the various switches and electrically operated parts.

Fig. 11 is a vertical sectional view and side elevational view similar to Figs. 3 and 4 of a modified form of the spring positioning and advancing unit, the entrance for the guideway being shown, however, at the left of the figure.

Figure 1:
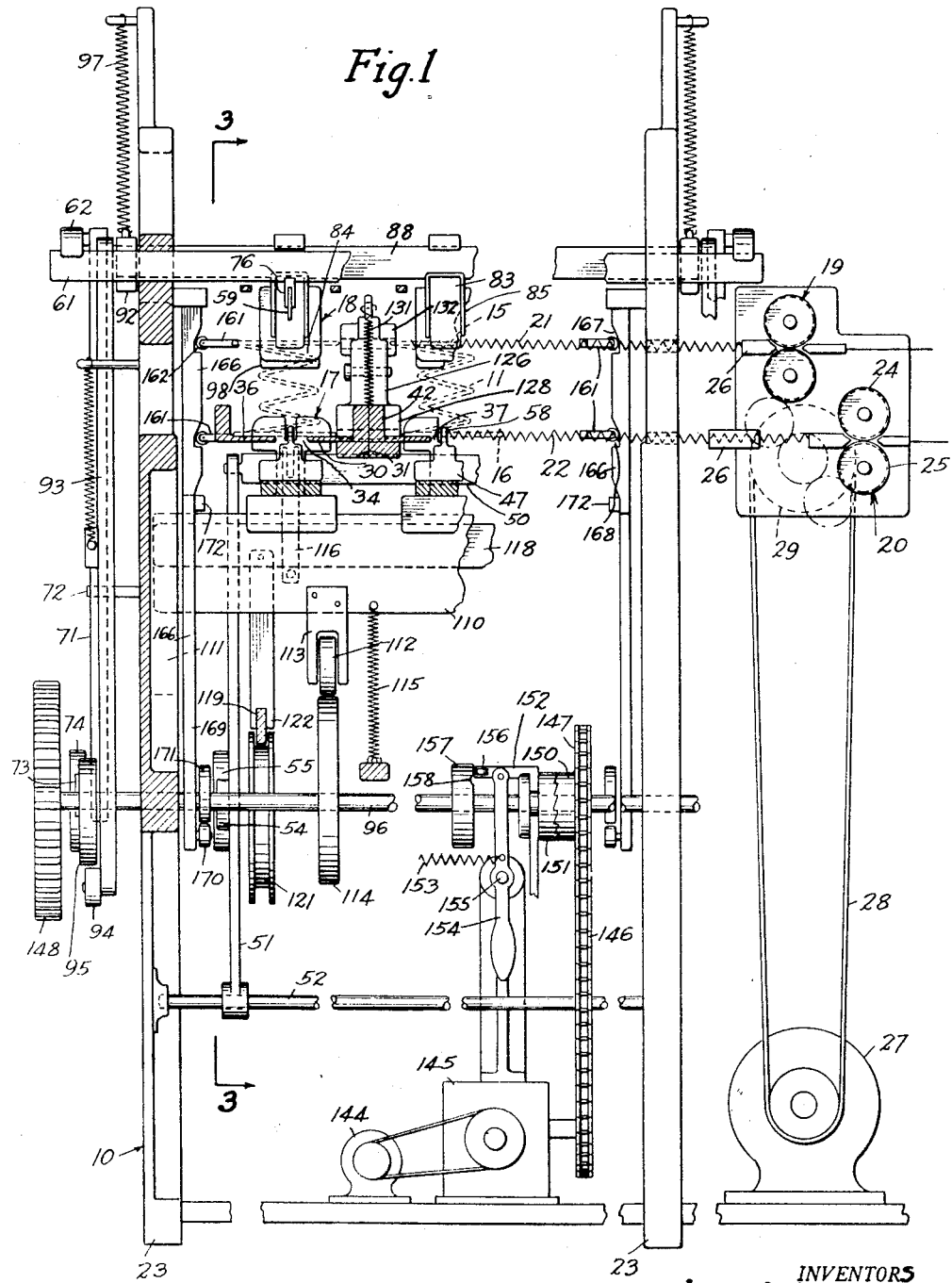

In order that the detailed description of the machine may be more readily understood, it may be here stated generally that a row of coil springs 11 is preferably though not necessarily, placed manually into a position in front of its tying position in the machine. The entire front row as 12 is then advanced into the tying position indicated by the row 13 at the same time that the row 14 and the rows previously tied are advanced, so that the tied rows and the untied row move in unison. The row 14 of the already tied assembly and the added front or untied row 13 thus advanced are arranged by suitable positioning means in a position wherein the front parts of the upper coils 15 of the row 14 rest upon and overlap the rear parts of the corresponding upper coils of the added front row 13. (See Figs. 4, 5, 8 and 9). Similarly, the lowermost coils 16 of the tied row 14 rest on and overlap the corresponding lowermost coils 16 of the row 13. The lower positioning units 17 then move upwardly and simultaneously the upper positioning units 18 move downwardly to engage and position the end coils with great accuracy and shape them to compensate for variations and irregularities therein so that the helicals 21 and 22 may be dependable wound thereabout. While the spring positioning and advancing means are at rest and hold the end coils in their proper positions, the coilers 19 and 20 (Fig. 1) form and wind the helicals 21 and 22 respectively around the upper and lower end coils of the adjacent rows 13 and 14. The helicals are cut to length preferably at the beginning of the cycle and before the advance of the rows is begun.

In the practical embodiment of the invention shown by way of example, the frame 23 and suitable members fixed thereto support the various fixed and movable guides, shafts, units and operating instrumentalities. The coilers 19 and 20, (Fig. 1) which are substantially identical, are both situated preferably at the same side of the machine—which is the right hand side as illustrated herein—and receive wire drawn from a suitable reel not shown, by means of the cooperating grooved rollers 24, 25 which force the wire through a helically grooved fixed die 26, thereby bending the wire into the desired helical form and longitudinally advancing and at the same time rotating the resulting helicals 21 and 22. The coilers being spaced apart vertically the same exact distance as the distance between the upper and lower coils of the coil springs which are in the tying position, the formed helicals are also spaced apart the same distance. Preferably, the rollers of the coilers are rotated by a separate motor 27 as through the belt 28, pulley 29 and a suitable train of gears operatively connecting the pulley to the rollers. This permits the coilers to be operated only when all other parts of the machine are at rest so that the helicals may be formed and fed only when the rows 13 and 14 are accurately held stationary and in the proper positions.

The helicals are formed with great accuracy as to diameter and pitch. Variations in the thicknesses and in the overall lengths of the helicals are so slight as to be immaterial. Consequently, by setting the end coils 15 and 16 of the rows 13 and 14 at the exact required uniform intervals, making due allowance for the comparatively considerable variations in the diameters, thicknesses and shapes of said end coils, it becomes possible unfailingly and dependably to wind an exact number of turns of the helicals around the end coils at the predetermined spaced intervals without interference and without the necessity for elaborate guiding or precautionary stop mechanism.

A fixed guideway is provided for each spring of the row 12 and for the correspondingly arranged springs of the other rows, said guideway serving to engage the upper and lower coils of the spring, to compress the spring to a predetermined extent initially and to permit the spring to be aligned approximately with the remaining springs of the row 12 ready to be forwarded to the tying position, the guideway also serving to guide the rows in their overlapped relation into and out of the tying position. In the form of the machine shown herein, each spring may be fed manually and individually into its guideway until the front row 12 is complete. For simplicity, each guideway is made preferably symmetrical about its vertical center line and comprises fixed upper and lower plates. The lower plate 30 (Figs. 3, 4, 8 and 9) constituting the right hand guideway for the lower coil 16, is supported by the member 31 which is secured at its front end to the transversely extending bars 32, 33 fixed to and extending between the side members of the frame 10. At its rear end, the member 31 is secured to and supported by the bars 34, 35 which are similar to the bars 32, 33. The left hand lower guide plate 36 is similar to the plate 30 and spaced transversely therefrom to provide the space or slot 37 therebetween for the movement of the row transfer mechanism later to be described. From the front end of each of the plates 30 and 36 projects a downwardly and forwardly inclined extension 38 (Figs. 3, 8 and 9) which widens toward its front edge, thereby producing a flared entrance opening to the guideway for the easy insertion of the upright coil spring thereinto. Fixed in an enlargement of the slot 37 and between the plates 30 and 36 is the stop 39 held by the bars 32 and 33 and having an uppermost inclined edge 40 projecting somewhat above the plates. The rear edge 41 of the stop prevents retraction of the coil spring after said spring is pushed into the guideway past the stop, thereby initially and approximately positioning the lower coil of the spring in the row 12. Upstanding flanges on the plates 38 aid in guiding the springs into the guideway, and suitable side rails as 42, 43 secured to the members 31 confine the lower end coil of the spring against transverse movement in the guideway during the advance of the spring.

Figure 2:
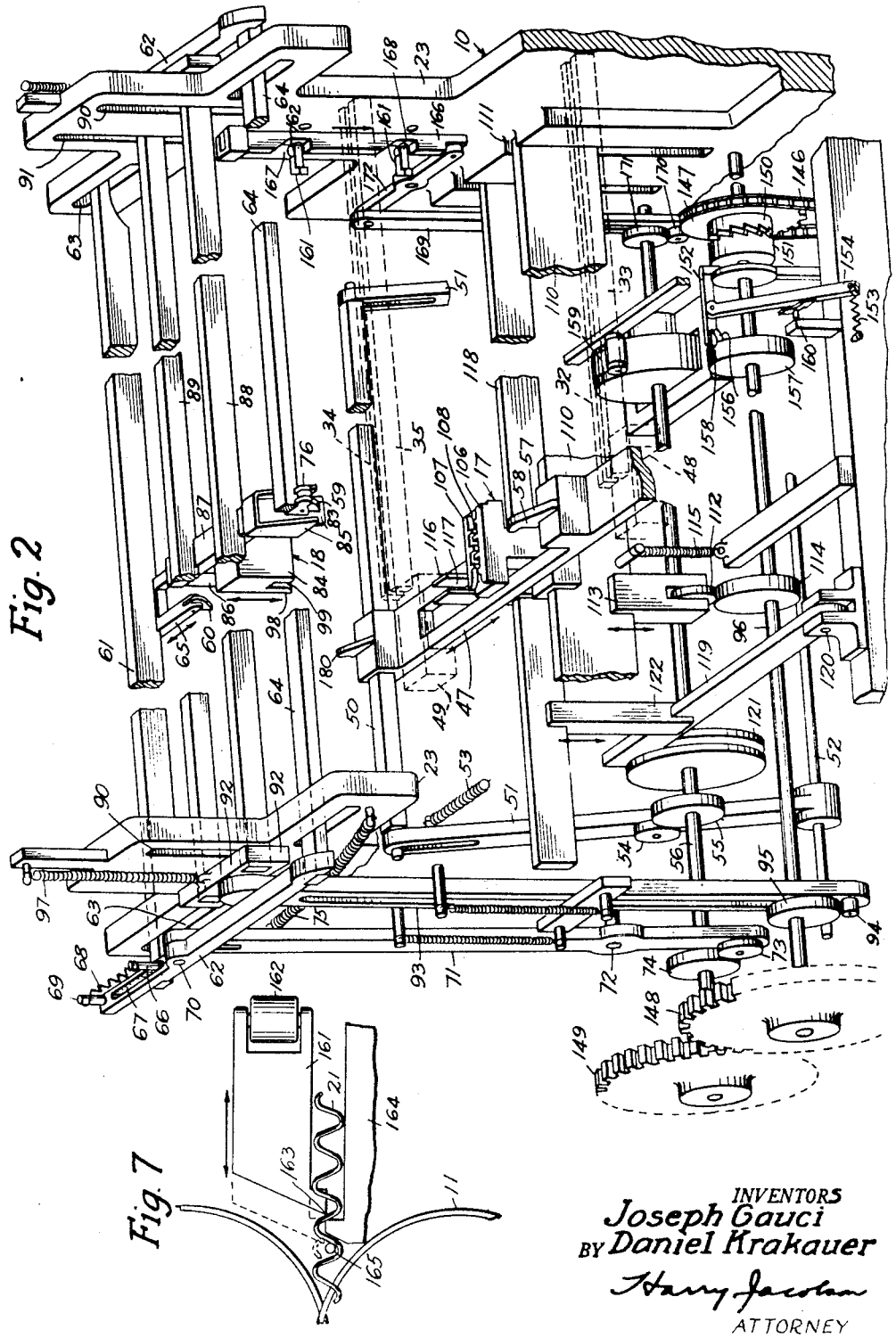
Fig. 2 is a fragmentary perspective view of the machine, showing the major part of one of the spring positioning units, certain other parts being omitted or broken away to expose the primary operating structure.
Figure 3:
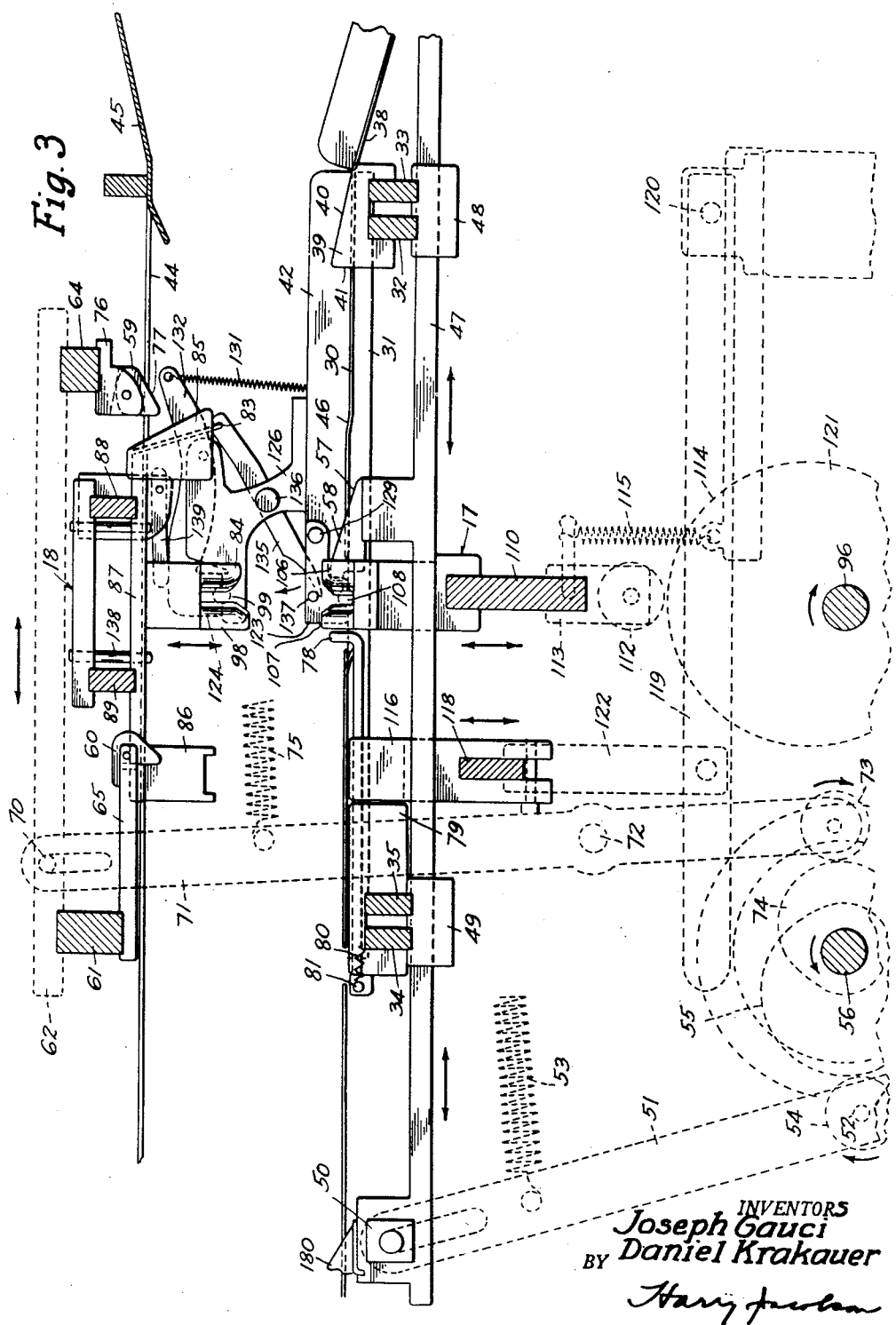
Fig. 3 is a vertical sectional view and side elevational view of one of the spring positioning units taken on the line 3—3 of Fig. 1 and showing the operating connection thereto in dotted lines, the parts being shown in the positions assumed thereby while the helical is being fed around the coil springs.

In the form of the invention shown in Figs. 1, 2, 3 and 4, the upper front part of the guideway is formed by the upper horizontal plate 44 suitably supported in a fixed position by suitable means such as bars similar to the bars 32, 33, 34 and 35 extending between the side frames of the machine, and as shown in Fig. 3, said plate 44 is continued forwardly and upwardly as at 45 to form the upper part of the flared entrance opening to the guideway. The plate 44 is slotted along its middle to permit the passage therethrough of the advancing and positioning mechanism.

It will be seen that when the coil spring is pushed into the guideway, the upper coil 15 thereof engages the upper inclined plate 45 while the lower coil engages the lower inclined plates, whereby rearward movement of the spring into position to form the row 12 compresses the spring initially. Such compression is aided by the stop 39. The forward middle part of the lower coil slides up along the upper edge 40 and then drops behind the rear edge 41 into position, so that the operator is apprised of the fact that further movement of the spring is unnecessary. At the same time, the rear part of the lower coil of the added spring is inserted underneath the front part of the lower coil of the spring in the row 13 to overlap said parts. Similarly, the upper end coils of the row 12 are inserted underneath the upper end coils of the row 13. The horizontal guide plates 30, 36 and 44 may be depressed at their forward parts into a different plane from the remainders thereof respectively to assist in attaining the desired overlapping of the springs as is shown for example at 46. After the added row of springs have been inserted into all of the guideways in their properly overlapped positions, the machine is started by the operator and the remaining operations are automatically carried out to the end of the cycle.

As has been indicated, means are provided for advancing the entire row 12 rearwardly into the tying position and at the same time advancing the already tied rows rearwardly out of the machine. In cases where the end coils of the coil springs may be greatly distorted in the course of the manufacture or the handling thereof, as when the coils lie in non-parallel planes at a relatively large angle to each other, or when the individual springs differ considerably in their respective unstressed lengths, or when the end coils of the springs are considerably out of alignment, the initial compression of the spring in the guideway may be insufficient to arrange the upper and lower coils in parallel planes, and the end coils of an individual spring may not be aligned, so that perfect control of the springs during their rearward advance may not always be attained. In that case, and in order to compensate for the various irregularities mentioned, we prefer to employ the spring advancing mechanism illustrated in Figs. 1 to 4 inclusive to engage and advance the top coils, and the somewhat different mechanism shown in said figures for advancing the bottom coils. However, where no great distortion occurs in the end coils, and where the lengths of the springs do not vary greatly, substantially identical mechanism may be used both at the top and bottom of the guideway for advancing the top and bottom coils as shown in Fig. 9.

Figure 4:
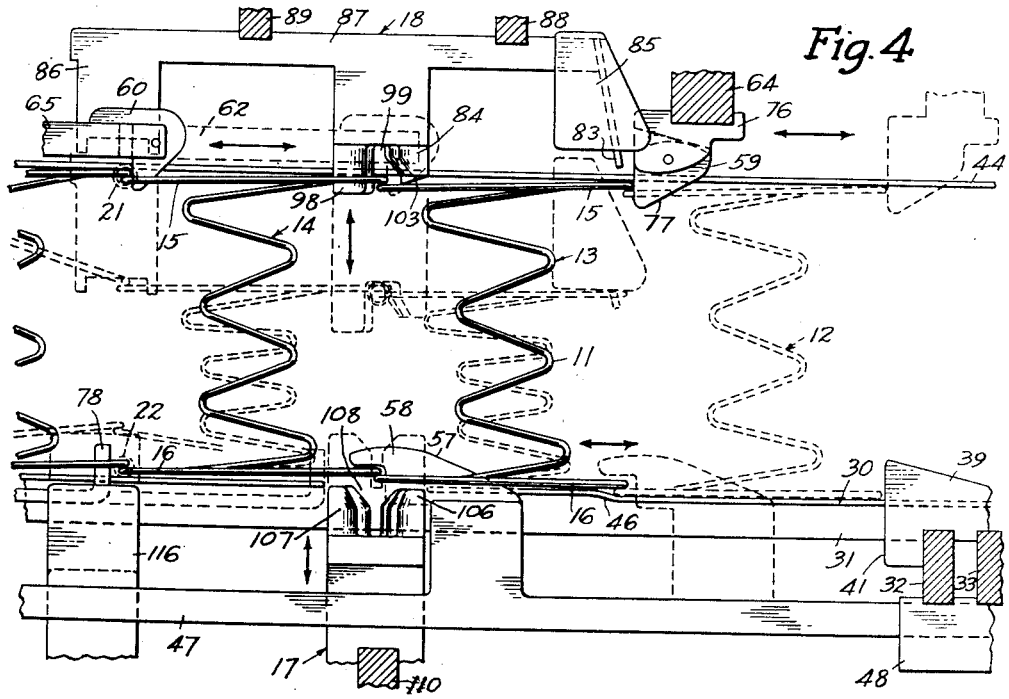
Fig. 4 is a similar enlarged view of the same showing the parts in the positions assumed thereby at the end of the advance of the coil springs and showing in dotted lines the positions into which the parts may move.

Referring now to Figs. 3, 4 and 8, the forwardly and rearwardly reciprocating slide 47 carries the hook 58 for rearwardly advancing the row 12 (which is shown in dotted lines in Fig. 4) into the tying position and for also advancing the row 13 and the tied rows rearwardly out of the machine. Said slide 47 is supported for reciprocation by the fixed supports 48 and 49 respectively secured to the bars 33, 32 and 34, 35. As best seen in Figs. 2 and 3, the connecting member 50 passes through all of the slides 47 and is preferably reciprocated by duplicate mechanism at both sides of the machine and comprising the crank 51 pivoted on the pivot rod 52 which is supported at its ends by the side frames of the machine. The spring 53 urges the cam roller 54 on the crank into engagement with the cam 55 on the cam shaft 56, whereby rotation of the cam shaft results in reciprocation of the slide 47 and of the advancing hook 58 through a stroke substantially equal to the diameter of the end coil 16. As the hook 58 moves forwardly on its return stroke into the dotted line position thereof shown in Fig. 4, the front part of the lower end coil of the spring in the row 13 and the rear part of the lower end coil of the spring in the row 12 ride up on the inclined upper edge 57 of the hook until the hook passes said parts of the lower end coils, whereafter the end coils drop back on the plates 30 and 36 to the rear of the hook, the springs yielding under the pressure of the hook edge 57. On the rearward operative stroke of the slide, the lower end coils of the springs in the rows 12 and 13 are engaged by the hook and carried rearwardly into the tying positions thereof.

Since the machine is quite wide from side to side, the various cams, cranks and other connections are preferably duplicated in most cases at both sides of the machine when they operate a transversely extending member, but in what follows, only one set of such cams and connections will be described and one set has been shown in the drawings.

The hook 58 maintains the lower coils of the rows 12 and 13 in their properly overlapped positions during the advance of the rows, while the proper overlap of the top coils may be attained by downwardly extending ribs in the plate 44 or by a depression therein similar to the depression 46 of Fig. 9. The upper coils of the rows 12 and 13 are advanced at the same time that the advance of the lower coils takes place.

In Fig. 9, the mechanism employed for this purpose is substantially identical to that just described.

However, in Figs. 2, 3 and 4 are shown independent ratchet hooks 59 and 60 to advance the row 12 and the tied rows respectively, said hooks insuring proper control of the movement of the rows of coil springs in spite of the variations in or distortion of the springs. The hook 60 is movable together with as well as relatively to the hook 59 to compensate for variations in the vertical alignment and diameters of the end coils, and is supported by the reciprocating transverse member 61 which slides in suitable horizontal slots as 63 in the side frames and is yieldably connected by the connecting member 62 outside of the frame to the similar transverse member 64 which supports the hook 59. An arm 65 is shown connecting the hook 60 to the member 61. The yieldable connection between the members 61 and 62 comprises the pin 66 upstanding from and passing through the slot 67 in the member 62 and movable in said slot, the pin being pulled rearwardly by the spring 68 secured thereto at one end and at its other end secured to the pin 69 upstanding from the member 62. Secured to the member 62 as at 70 is the crank 71 which is pivoted to the frame as at 72 and carries the roller 73 pulled into engagement with the cam 74 on the cam shaft 56 by the spring 75.

At about the same time that the forward movement of the slide 47 takes place, the connecting member 62 and the members 61 and 64 also move forwardly to carry the hooks 59 and 60 to the dotted line positions thereof shown in Fig. 4 wherein the hook 59 is in front of and engages the most forwardly part of the spring in the row 12 and the hook 60 engages the middle parts of the overlapping top coils of the adjacent tied springs in the rows 13 and 14. On rearward movement of the member 62, the hook 59 moves the row 12 rearwardly into the tying position and the hook 60 moves the rows 13 and 14 rearwardly until the spring of the row 13 has moved into the position previously occupied by the row 14 ready for tying to the row 12 which has assumed the position of the row 13.

The hook 59 is pivoted in the slotted bracket 76 and can swing in a clockwise direction to clear the top coil when the inclined edge 77 of the hook strikes the front part of the top coil of the row 12 during the forward or return movement of the hook. The hook can thereby be carried past and in front of the top coil, being so balanced that it swings to a position in which the rear edge thereof is vertical, when allowed to do so. Similarly, the hook 60 is pivotally mounted in a slot in the arm 65 and can swing out of the way as the hook is moved on its return stroke to a position in front of the row 14, a suitable tail or extension tending to overbalance the hook and to maintain it with its operating edge vertical.

The row of springs being of little weight and hence being easily displaceable, means are provided for controlling the advance of the rows by the hooks into the tying position. Said means takes the form of a yieldable resisting member for each of the lower coils of the springs advancing from the row 13 to the row 14. The resisting member 78 (Figs. 3 and 4) has an upstanding front end normally arranged inside of the lower coil, of the spring of the row 14, the lower coils of the springs being raised by mechanism soon to be described, to permit said front end to be inserted inside of the lower coil of the proper spring. The member 78 is slidably mounted in the fixed supported 79, which in turn is secured to the support bars 34, 35, the member being pulled forwardly by the tension spring 80 secured at one end to the pin 81 on the member and at its other end secured to the support. It will be seen that as the tied rows 13 and 14 are advanced rearwardly out of the tying position by the hook 58, the lowermost coils of the springs engage the member 78 and force said member rearwardly against the action of the spring 80, thereby clamping the lower coils of a pair of springs between the hook 58 and the member 78, and avoiding any possibility of loss of control, displacement or overrun of the rows during their advance and permitting the front part of the row 13 to be positioned with sufficient accuracy for engagement by the accurate positioning means 17.

In Figs. 8 and 9, the resisting members are substantially identical for the top and bottom coils, the member terminating in a C-shaped part 82 adapted to engage the outermost spring coils at spaced apart points.

As shown in Figs. 1 to 4 inclusive, the spring blade 83 acts on the top coil to urge it forwardly or in the direction opposite to the direction in which the top coil is moved by the hook 59. The vertically reciprocating blade spring 83 enters the inside of the top coil of the spring in the row 13 as said spring reaches the tying position, as shown by the dotted line position of the blade spring and of the row 13 in Fig. 4, and resists further advance of the row. The blade spring also urges the top coil forwardly into firm engagement with the forward top coil locating member 84, which is part of the locating means soon to be described, and which is moved down into the dotted line position thereof shown in Fig. 4 to aid in positioning the top coil accurately in the tying position. Assisting the spring 83 and the member 84 to position the top coils are the top coil depressors 85 and 86, which move downwardly with the blade spring and the member 84 as a unit at the proper time, thereby to compress the rows 13 and 14 and to arrange the top coils thereof in an exact predetermined horizontal plane, eliminating the effect of distortion of the top coils, lack of alignment thereof and variations in the heights thereof.

The blade spring 83 is secured at its upper end to the support 87, the depressors 85 and 86 and the member 84 also being secured to said support, which is in turn secured to the transversely extending members 88 and 89, the ends of the members 88 and 89 passing through and being guided by suitable slots as 90 and 91 respectively in the side frames of the machine. Outside of the frame, the members 88 and 89 are connected by the connecting bar 92 which is vertically reciprocated by the rod 93 pivoted thereto at its upper end. At the lower end of the rod is secured the cam roller 94, which is urged against the cam 95 on the shaft 96 by the spring 97.

As has been indicated, the means for setting, accurately locating and holding the coil springs in the tying position for receiving the helicals and to compensate for irregularities therein, consists of a vertically reciprocating upper unit designated generally by the numeral 18, and a vertically reciprocating lower unit designated by the numeral 17. As many of such units are employed as there are coil springs in the row to be assembled, but since the corresponding units are all substantially identical, only one set of each need be described and shown.

Figure 5:
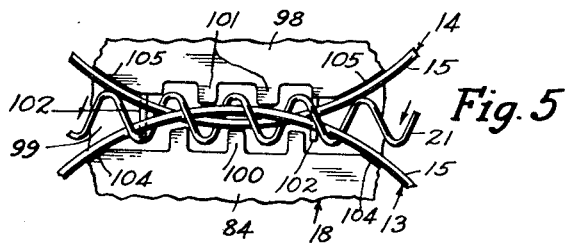
Fig. 5 is a fragmentary bottom plan view of the upper positioning means for the coil springs showing the helical in place.

The upper unit 18 has been in part described hereinbefore as including the top forward member 84 and the coil depressors 85 and 86 together with the operating parts therefor. The coil-positioning member 84 is separated from the similar member 98 by the groove 99 which is aligned with and is adapted to receive the helical 21 (Fig. 5), the members 84 and 98 depending from the support 87, and the rear member 98 being longer than the front member 84. The groove 99 is preferably slightly wider than the diameter of the helical so that said helical does not touch the walls of the groove and no resistance is offered to the movement thereof as the helical is formed, advanced and rotated about the end coils by the coilers. However, a plurality of spaced upright projections as 101 extend forwardly from the member 98 into the groove 99 and a similar upright coil-positioning projection 100 extends rearwardly into the groove from the member 84, the projections 101 alternating with the projection 100 and all of the projections being so arranged and being of such width as to fall between adjacent coils of the helical. Consequently, the helical does not touch the projections as it is advanced through the groove 99, and the projections normally do not serve any guiding function for the helical. However, in cooperation with the arcuate ends 104 and 105 of the members 84 and 98 respectively, the projections serve the important function of accurately positioning and, if necessary, shaping the top coils 15 so that the helical may be uniformly advanced and wound about the coils with substantially no friction, regardless of irregularities in the shape and sizes of the end coils. For this purpose, the projections 101 and the arcuate ends 104 of the member 84 are so positioned that a top coil of the row 13 of theoretically correct diameter curvature and thickness touches the projection 101 and the ends 104 as shown in Fig. 5 when the rows 13 and 14 are in the tying position and the coil is in the groove 99. Similarly, the top coil of the row 14 is intended to touch the projection 100 and the ends 105 of the member 98 when in the tying position in the groove 99. When the unit 18 is lowered to a predetermined lowermost position, the pressure exerted by the members 84 and 98 and particularly by the parts 100, 101, 104 and 105 thereof, shape the possibly irregular or distorted overlapped parts of the top coils to the exact shapes and diameters required to permit the tying operation to be performed dependably and with certainty and with little or no friction just before the end of the cycle of operations.

Suitable depending stops as 102 shown in and extending the greater part of the way across the groove 99 engage the top coils as the unit 18 is moved downwardly into the spring compressing position thereof shown by the dotted lines of Fig. 4, and depress said top coils to an exact predetermined horizontal plane determined by the lowermost positions of the lower end edges of the stops 102, but prior to the complete depression of the top coils and during the advance of the row 12 into the tying position of the row 13, the downward movement of the unit 18 is momentarily halted in a position to permit the top coil moving into the row 13 to pass the member 84 and to engage the longer member 98, after which the downward movement of the unit is resumed and the top coil positioned for tying. The lower part of the rear wall of the member 84 constituting the front wall of the groove 99 is inclined downwardly and forwardly to insure the entrance of the top coil of the row 13 into the groove during the final part of the movement of the unit 18.

It will be remembered that the hooks 59 and 60 respectively advance the row 12 into the tying position and advance the row 13 into the position of the row 14 just after the beginning of the cycle of operations. Hence the member 98 is first inserted into the top coil of the spring in the moving row 13 to prevent too great an advance of said top coil by the hook 60, while the top coil moving into the row 13 is forced against the member 98 and overlapped under the top coil of the next row. A pair of transversely spaced fixed cams as 103 on the plates 44, one on each side of the member 84 and extending below the projections 100 insure the depression of the top coil of the moving row sufficiently to accomplish the overlapping of the top coils of adjacent rows if such overlapping has not been previously attained or if relative displacement of the top coils has occurred. Excess movement of the operating mechanism moving hook 60 after the top coil of the row 14 has been pulled tightly against the ends 106 is taken up by the extension of the spring 68 as hereinbefore described.

The lower coil positioning unit 17 is devoid of any spring compression means such as the depressors 85 and 86, but consists of the members 106 and 107 spaced apart by the transverse groove 108 therebetween (Figs. 4 and 8). Said groove is flared at its upper end to insure the proper entrance of the bottom coils thereinto. Projections similar to the projections 100 and 101 are provided on the members 106 and 107 and the arcuate ends on the members serve the same purpose and functions as the similar ends on the upper coil members 84 and 98, that is, to position and shape the lower end coils to compensate for irregularities therein. A forwardly and rearwardly extending groove 109 is made through the middle of the members 106 and 107 to permit the hook 58 to enter thereinto when it forwards the bottom coils to the tying position. To reciprocate the unit vertically into and out of the tying position thereof thereby to arrange the bottom coils for tying by the helical 22, the members 106 and 107 are secured to the transversely extending member 110, the ends of which are guided by the vertical grooves 111 in the side frames. A roller 112 is carried by the extension 113 depending from the member 110 and is pulled against the cam 114 on the shaft 56 by the spring 115, whereby rotation of the shaft causes the desired reciprocation of the unit 17.

On upward movement of the unit, the adjacent parts of the overlapped bottom coils of the rows 13 and 14 enter the groove 108 and are forced against the projections and arcuate ends of the members 106 and 107 to shape, position and hold said parts of the bottom coils ready for the tying operation. After the coils have been tied by the helical 22, the unit 17 descends to free the bottom coils and the helical, whereafter the thus tied springs are advanced rearwardly by the hook 58 as previously explained. However, to permit such advance, the rear part of the row 14 is manipulated by lifting it together with the coil of the next row tied thereto, above the top of the resisting member 78 which would otherwise interfere with the advance. This is accomplished by the vertically reciprocating lifter 116 which engages the above mentioned lower coils and lifts them to the position shown by the dotted lines of Fig. 4, a sufficient distance to clear the member 78. The lifter 116 is grooved as at 117 to receive the member 78 therein and is reciprocated by the transverse member 118 to which it is secured, through the lever 119 pivoted to the frame as at 120 and the cam 121 on the shaft 56, the lever being connected to the member 118 by the link 122. The bottom coils mentioned need be maintained in their lifted positions only until they have passed the member 78 or until said member is arranged inside of the lower coil of the spring in or approaching the row 14.

Figure 6:
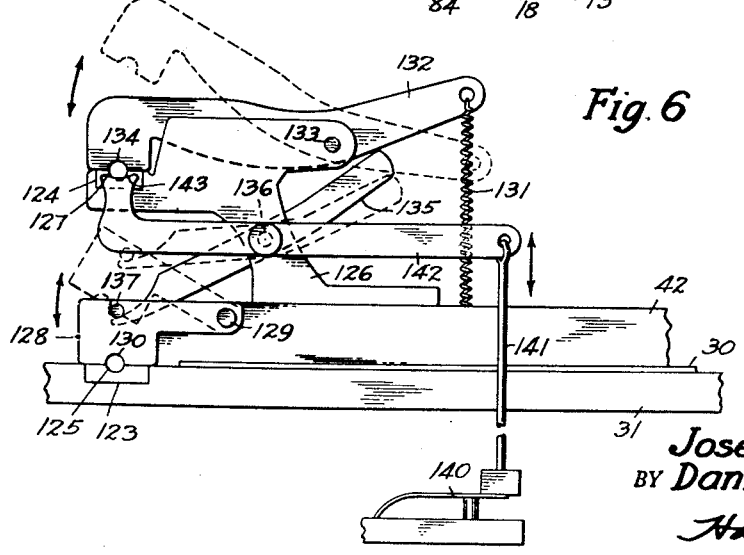
Fig. 6 is a side elevational view of one of the guides for the helical and of the cut-off switch operated by the leading end of the helical for deenergizing the former and feeder for the helical, the open or inoperative position of the guide being indicated in dotted lines.

Means are provided for assuring the maintenance of the axis of the helicals in a straight line during the feeding of the helicals, since the positioning units 17 and 18 do not perform such functions excepting when the helical sags or is distorted in some manner out of its normal position wherein its axis is a straight line and its coils are uniformly spaced and of the same diameter. Said means is best seen in Figs. 3, 6 and 8 and comprises a lower fixed guide 123 for the lower helical 22, an upper fixed guide 124 for the upper helical 21, and a movable guide cooperating with each of the fixed guides. Each of the guides has a semi-cylindrical groove or recess extending transversely therethrough, so that when the guides are in their operative positions, a hole is formed of about the diameter of the helical, the walls of the hole guiding the helical in its advance transversely through the machine. One set of such guides is provided for each spring in the row, each of the sets being arranged between adjacent sets of the positioning units 17, 18 to so space the sets of guides that they support the helicals at short intervals and insure the entrance of the helicals dependably and accurately into the grooves between the positioning members 84 and 98, and between the members 106 and 107.

The lower guide 123 is secured in a suitable recess in the supporting member 31 (Fig. 6) and has the semi-cylindrical horizontal groove 125 therethrough. The upper fixed guide 124 is fixed in the bracket 126 secured to the top of the rail 42 and has the semi-cylindrical horizontal groove 127 therethrough. The lower movable guide 128 is pivoted to the rail 42 as at 129 and has the horizontal semi-cylindrical groove 130 therethrough concentric with the groove 125 only during the feeding of the lower helical by the coiler. When feeding of the helicals has been completed, the end of the cycle of operations is reached, but the movable guide may remain closed upon the fixed guide until after the next cycle has been initiated, the helicals severed, and the next advance of the rows of springs is about to begin. Then, to free the helicals, preparatory to such advance, the movable guides are swung about their respective pivots into the dotted line positions thereof shown in Fig. 6. This is accomplished by the spring 131 secured at its upper end to one end of the lever 132 and at its lower end fixed to the rail 42. The lever 132 is pivoted to the bracket 126 as at 133 and carries the upper movable guide having the groove 134 therethrough, the spring serving to rotate the lever 132 in a clockwise direction to separate the upper guides. The lower guides are simultaneously separated by the rotation of the lever 135 which is pivoted to the bracket 126 as at 136 and at one end thereof engages the pin 137 projecting from the movable guide 128. The other end of the lever 135 being in the path of the right hand end of the lever 132 as viewed in Fig. 6, depression of said end depresses the corresponding end of the lever 135 and rotates said lever and the guide 128 in a clockwise direction to free the helical.

After the rows have been advanced to the tying positions and as compression of the rows 13 and 14 is begun, the lever 132 is rotated in a counter clockwise direction to close the pairs of guides (Fig. 3) through the pins 138 acting on said lever or on a suitable member 139 secured thereto, the pins being secured to the member 87 and reciprocating vertically therewith. It will be understood that the guides are closed together to provide passages for the helicals during the tying operation which consists of the formation of the helicals 21 and 22 and the simultaneous longitudinal advance and rotation thereof to wind a predetermined number of turns around the overlapped parts of the end coils of the rows of springs. Since the spacing between the guideway and the row-advancing units and the positioning units is accurately adjusted, and since the helicals are accurately formed and the end coils accurately positioned, the coils of the helicals always fall in the same relative positions between the projections 100 and 101 of the positioning units and are wound in exactly the same manner about the adjacent springs to tie them together. The walls of the passageways formed by the cooperating grooves in the guides serve to support the helicals during their advance.

As the last step of the cycle, advance of the helicals ceases automatically when the tying operation is completed. For this purpose, current to the coiler motor 27 is cut off by the operation of the switch 140 (Fig. 6) of the "micro" switch type. Said switch is located at the left hand end of the machine as viewed in Fig. 1 and is operated through the link 141 and the lever 142 by the leading end of the upper helical 21. The switch is normally biased by a suitable spring to a position wherein it is closed on the coiler motor side, and is of the double throw or two-way type having a coiler motor side and a transfer motor side. The advance of the helical is continued for a short distance past the last spring in the tied row in order that the helical may engage and depress the lever 142 and thereby to throw the switch 140, the end 143 of the lever being suitably shaped for that purpose, and the switch closing that part of the circuit to the transfer or row-advancing motor which is controlled by said switch and which has remained open during the operation of the coilers. The transfer motor is shown at 144 of Fig. 1 and its connections to the row-advancing mechanism will be later described.

It has been indicated that the coiler motor 27 can operate only when the transfer motor 144 does not operate and that the transfer motor can operate only when the coiler motor does not. Hence at the beginning of the operation of the coiler, the transfer motor is rendered inoperative. At the end of the tying operation, the switch 140 cuts off the current to the coiler motor and the coiler becomes inoperative, thereby completing the cycle and halting the machine, said switch being closed on transfer motor side to prepare the transfer motor for operation.

The transfer motor rotates the cam shafts 56 and 96 to move the various advancing and positioning mechanisms hereinbefore described, through the reduction gearing 145, the sprocket chain 146, the sprocket wheel 147 loose on the shaft 96, and the gear 148 on the same shaft meshing with the gear 149 on the shaft 56. A toothed clutch member 150 is secured to the wheel 147 and a cooperating clutch member 151 slidably secured to the shaft 96 whereby when the clutch members are engaged, power is transmitted to the shaft 96. The clutch is automatically disengaged and the current to the transfer motor is cut off on each revolution of the shaft 96. This is done by the horizontally slidable clutch-operating arm 152 entering an annular groove in the clutch member 151 and pivoted at its lower end to an adjacent fixed part of the machine, the arm being biased toward the clutch-disengaging position thereof by the spring 153 (Fig. 2) through the hand lever 154 which is pivoted to a fixed member as at 155 (Fig. 1). A lug 156 at one end of the arm 152 normally rides on the notched disc 157 secured to the shaft 96 and having the notch 158 therein, the spring 153 urging the lug against the disc. The lever 154 carries a suitable member movable with the lever and arranged to operate the two-way switch 160, which is in the lines to the motors 27 and 144 as shown in Fig. 10. When the lug enters the notch during the rotation of the disc, the arm 152 moves toward the left and carries the clutch member 151 out of engagement with the member 150 whereby the power delivered to the shaft 96 is cut off. A suitable brake 155 (Fig. 2) on the shaft 56 resists rotation of the shafts 56 and 96 by momentum after the clutch has been disengaged.

At the same time that the clutch is disengaged, the double throw "micro" switch 160 is operated to complete the closing of the circuit to and to start the coiler motor 27, it being remembered that the switch 140 closes another part of the circuit to said motor when no helical is present to depress the switch lever 142. The coiler motor being thus energized on the disengagement of the clutch, the helicals are formed, advanced and wound in place until the switch 140 is again thrown to the transfer motor side and the circuit to the coiler motor opened. When the transfer motor is again started to repeat the cycle, the hand lever 154 must first be moved in the proper direction to remove the lug 156 from the notch 158 in the disc 157, thereby to interengage the clutch members and to throw the switch 160 to the transfer motor side thereby to close the circuit to said transfer motor, whereby said motor continues to operate until the switch is again thrown and the clutch disengaged at the end of the revolution of the disc 157.

In the form of the machine shown herein, the helicals formed and wound at the end of a cycle are severed at both ends thereof as the first operation of the next cycle. However, it will be understood that the severing of the helicals may be performed at another time or place as at the end of the cycle if desired. In Fig. 7, the helical severing means is shown to comprise the horizontally reciprocating cutter 161 carrying the cam roller 162 at one end and having the cutting edge 163 at the other end thereof, said cutting edge cooperating with the fixed cutter 164 to cut the helical and cooperating with the fixed pin 165 to bend the cut end of the helical into a partial loop. To reciprocate the cutter 161, the notched member 166 (Figs. 1 and 2) is provided with the spaced apart notches 167 and 168 normally to receive the rollers 162 of the cutters for the upper and lower helicals respectively, said member being vertically reciprocated by the rod 169 carrying the cam roller 170 which is spring-pulled against the cam 171 on the shaft 56, the lever 172 connecting the rod to the member 166. As best seen in Fig. 1, each of the helicals 21 and 22 is cut off at both of the ends thereof at the same time and hence four sets of the cutters above described are provided.

It will be understood that when the excess projecting free end portion of the helical 21 is cut off, the switch lever 142 is freed of the helical and rises under the action of the switch spring to its normal position closing the coiler motor side of the switch and opening the transfer motor side thereof.

Either of the motors 27 or 144 may be operated independently of the cycle when desired as at the first row of springs when a cushion or mattress is begun, or at the last row of the mattress to omit the helicals at the beginning or end of a mattress or to advance a row of springs without causing the machine to operate throughout an entire cycle. Suitable electrical connections and apparatus are provided for these purposes as well as for the normal operation of the machine, as is shown by the wiring diagram of Fig. 10. In the explanation of the diagram, the normal electrical means for the usual operation of the machine will be first described and the special switches will be described later.

In the circuit to the transfer motor 144, is a magnetic starter 175 of the sustained contact type, which when energized, closes the circuit to the transfer motor. A similar magnetic starter 176 does the same for the coiler motor 27. However, the circuit to each magnetic starter is controlled by both switches 140 and 160. When these switches are closed on the coiler side, the transfer sides of the switches are of course open, and the starter 176 is energized to close the circuit to the coiler motor and to start said motor. Such closing of both switches occurs only at the beginning of the cycle when the switch 140 has been operated by the helical and the switch 160 has been manually and intentionally operated by the movement of the lever 154 by the operator. Consequently, not only can no advance of the rows be initiated while the coiler is operating, but none can be accidentally initiated at the end of the cycle.

During the revolution of the shafts 56 and 96 and of the disc 157, the helical severing operation is the first one to be performed to cut off the projecting end of the helical, thereby freeing the switch operating lever 142 from the helical 21 so that the spring of the switch 140 becomes operative to close said switch on the coiler side preparatory to operation of the coiler. Such operation cannot begin, however, until the end of the revolution of the shafts, when the lug 156 again enters the notch in the disc 157. After the helical severing operation, the various hooks advance the rows of springs, after which the springs are compressed and the end coils thereof accurately positioned for tying, and at the end of revolution of the disc 157 when the springs have been advanced and positioned, the clutch is disengaged and the switch 160 closed on the coiler side thereby deenergizing the transfer motor and energizing the coiler motor which operates the coilers to tie the rows. The coiler motor is deenergized by the switch 140 after the tying is completed, at which time the switch 140 is closed on the transfer motor side. The cycle has been thus completed, a new row of springs is fed to the machine, the lever 154 moves to engage the clutch and close the switch 160 on the transfer motor side and the cycle is repeated.

At the beginning of a cushion or mattress, no helical is required. Hence the row 12 of springs which has been advanced to the tying position of row 13 must be again advanced without operation of the coilers. The sustained contact push button switch 178 is interposed in the line for this purpose. Normally, said switch 178 is closed, but when no helical is wanted, the proper button of the switch is pressed to open the switch and to open the circuit to the starter 176. All of the operations controlled by the transfer motor may now take place, but the spring compressing and positioning operations are merely wasted and do not result in any effect on the row of springs. Before starting the next cycle, the switch 178 is manually closed so that the helicals will be supplied to the next succeeding rows to tie them.

When the helicals are omitted between rows as above explained, the hooks 58 do not advance the rows or the mattress which has already been assembled. To accomplish such advance and thereby to prevent interengagement of the separate mattresses an advancing hook 180 (Figs. 3, 8 and 9) is mounted on the slide 47 in such a position that normally it does not engage a spring. That is, the hook 180 is normally arranged sufficiently in front of the springs of the row 181 that when said row is forwarded by the hooks 58, the hook 180 is inoperative. However, when the helicals are omitted between mattresses and the hook 58 fails to advance the row 181, the hook 180 catches up to and engages and advances the row thereby advancing the tied mattress out of the way of the incoming row.

A momentary contact push button switch 177 is arranged in parallel to the switch 140 whereby the transfer motor may be operated to effect the advance of the rows of springs without operation of the coilers as at the beginning and end of a mattress or at any other point thereof where no helical is wanted. When the switch 160 is closed on the transfer side by operation of the lever 154 and the switch 177 is closed, the starter 175 is energized and the motor 144 is started.

A similar momentary contact push button switch 182 is interposed in the line to the coiler starter 176 to operate the coilers alone when it is desired to do so, as for example, during adjustment of the machine or testing thereof.

In the form of the invention shown in Fig. 9 wherein the row-advancing and positioning mechanism is substantially identical for the top and bottom coils of the spring, it will be understood that the connections for vertically reciprocating the corresponding parts which move vertically in opposite directions are similar to those already shown and described for operating the lower coil positioning means and the lifters, and that the row-advancing means for the top and bottom coils are interconnected to move as a unit in an obvious manner.

Referring now to that form of the invention shown in Fig. 11, the advancing and positioning mechanisms are identical for the top and bottom coils, but the spring positioning unit 185 and the unit 186 for the respective top and bottom coils are given a greater movement toward and from each other than that shown in Figs. 8 and 9 in order to effect a greater compression of the rows 13 and 14 of springs at the tying position. That is, since the initial compression of the spring effected by the insertion thereof into the guideway 187 may be insufficient for certain purposes, the spring of the row 13 is reduced in height by raising the bottom coil 188 thereof by means of the lifter 190 from the dash-dot position shown to the tying position shown in full lines, and the top coil 189 also shown in its initial position in dash-dot lines is depressed by the depressor 191, said coils being moved a sufficient distance to clear the resisting members 192 and 193. Similarly, the lifter 194 raises the bottom coil 195 of the spring in the row 14 to the required level to clear the resistor 192, and the depressor 196 depresses the top coil 197 of said spring to the level required to clear the resistor 193.

The depressors 191 and 196 are suitably secured to the upper positioning unit 185 and reciprocate vertically therewith as a unit at the proper time, while the lifters 190 and 194 are suitably secured to and reciprocate vertically with the positioning unit 186. Each of the positioning units is similar to the corresponding unit shown in Figs. 8 and 9, having a suitable groove 198 therein for the passage of the helical 21 or 22 as well as projections similar to the projections 100 and 101 for shaping and positioning adjacent parts of the spring coils, and stops as 102 for determining the levels to which the coils are moved. The lifters and depressors are arranged preferably out of alignment with and preferably to one side of the advancing hooks 199 to permit movement of said hooks to the tying position without interference thereby. Said hooks are reciprocated horizontally to advance the row 12 into the position of the row 13, and simultaneously to advance the row 13 into the position of the row 14 as hereinbefore described in connection with the hooks 58, the hooks operating in a forwardly to rearwardly extending slot in the top and bottom of the guideway similar to the slot 37. To urge the resistor members to move horizontally toward the tying position, each of said resistors is provided with a spring as 200. The resistors also serve the purpose of guides for the rows of springs moving rearwardly out of the tying position and out of the machine.

In order to insure proper overlapping of the adjacent lower coils of adjacent springs, a rib as 201 projects upwardly from each of the transversely spaced fixed lower supports 202 of the guideway 187, said ribs raising the lower coils of the springs in the row 13 by about the diameter of the wire of the spring to permit the lower coil of the row 12 to pass thereunder when the rows 12 and 13 are advanced by the hooks 199. The ribs 201 are of such length that the lower coil 188 projects forwardly of the front ends of the ribs when the coil is in the tying position. Similarly, the ribs 203 extend downwardly from the upper supports 204 of the guideway at the top of the row 12, and arrange said top coil sufficiently below the undepressed top coil 189 to attain dependable overlapping of said coils in exactly the same manner for each succeeding row.

The depressors and lifters operate only after the rows 12 and 13 have been advanced to the tying positions occupied by the rows 13 and 14 respectively by the hooks 199. During such advance of the row 13, the rearmost points of the end coils 189 and 188 engage the front end edges of the resistors 193 and 192 respectively and force the resistors back against the action of the springs 200, the rows being clamped between the hooks and the resistors. When the hooks have advanced the rows to the tying position, the unit 185 descends and the unit 186 rises to compress the springs and thereby to withdraw the end coils from the resistors which are freed to spring forwardly to the initial positions thereof ready to repeat the operation. The rear helicals 21a and 22a of the row 14 now rest against the inclined edges of the respective resistors whereby, when the units 185 and 186 are moved out of the tying positions, said helicals do not move but remain ready for advancement on the next cycle with the rows which they tie together. On such advance, the helicals slide along the inclined edges of the resistors as guides, permitting the springs to expand as they move out of the machine. Suitable plates at the top and bottom of that part of the guideway rearwardly of the tying position and similar to those shown in Figs. 8 and 9 may be used to prevent undesired expansion of the springs of the rows 13 and 14 as they move rearwardly.

While certain specific embodiments of the invention have herein been shown and described, it will be understood that various changes may be made therein without departing from the spirit of the invention defined in the appended claims.

We claim:

1. In a machine for assembling coil springs, a slotted guideway for the springs, means in the guideway for overlapping adjacent end coils of a pair of corresponding springs in adjacent rows of such springs, means reciprocating horizontally in the slot of the guideway for advancing the springs into a tying position wherein the rear part of one of the pair of springs and the front part of the other spring are in position to be tied together by a helical, vertically reciprocating means at the tying position for compressing the springs to move the upper and lower coils thereof to a predetermined level and for positioning the upper and lower coils in predetermined overlapping relation, a pair of vertically spaced apart coilers at one side of the machine for forming and advancing helicals horizontally around said parts of the upper and lower coils of the springs at the tying position while the springs are at rest and compressed, and means for resisting the advance of the springs thereby to control the movement of said springs into the tying position.

2. A machine according to claim 1 wherein the spring-compressing and positioning means is provided with a passage therethrough for the helical, said passage being restricted by alternately arranged spaced apart upright projections extending in opposite directions from opposite walls of the passage and having the inner end edges thereof in sufficient spaced relation to each other to remain normally out of contact with the helical advanced through said passage by the coilers, curved end surfaces on one wall of the passage cooperating with the projection on the other wall of the passage to shape and position the end coil of a spring, and means on another wall of the passage determining the levels to which the end coils of the springs are moved on the reciprocation of the last mentioned means.

3. A machine according to claim 1 including a helical guide having a passage therethrough in axial alignment with the spring-positioning means, said guide comprising a fixed part having a smooth semi-cylindrical groove therein and a swingable part having a corresponding semi-cylindrical groove therethrough, means for swinging the swingable part toward and from the fixed part to form a smooth cylindrical guide wall for the helical and to free half of the helical alternately, and means on the guideway for supporting the guide adjacent the tying position.

4. A machine according to claim 1 wherein the resisting means includes a spring and a member urged by the spring toward the tying position and engaged by the coil springs and movable therewith on the advance of the coil springs.

5. In a machine of the character described, reciprocating means for shaping and positioning the end coils of a pair of coil springs comprising a member having a passage therethrough open at one side and at its ends, a projection having a vertical inner edge extending partway across the passage from each of the opposite side walls thereof, the projection extending from one wall being out of alignment with the projection extending from the other wall, curved end surfaces on one side of the passage shaped and arranged to cooperate with the projection of the other side of the passage to shape and position an end coil of one spring and similar end surfaces on the other side of the passage cooperating with the projection on said one side of the passage to shape and position an end coil of an adjacent spring, and means on the remaining wall of the passage determining the levels to which said end coils are moved on the reciprocation of said means.

6. A machine according to claim 5 including a pair of guide members for a helical arranged in axial alignment with and adjacent to the passage of the reciprocating means, each of said members having a smooth semi-cylindrical bore therethrough, one of the members being fixed and the other being pivotally mounted to close upon the fixed member into position to arrange the bores of the members concentrically and to form a cylindrical passage, and means for swinging said other member toward and from the fixed member in predetermined timed relation to the movement of the reciprocating means.

7. A machine according to claim 1 including a two-way switch operated by the helical when the helical has been formed and advanced a predetermined distance, a first motor operatively connected to the coilers and controlled by the switch, a second motor operatively connected to the spring advancing means and controlled by the switch and also operatively connected to the spring compressing and positioning means, said switch permitting energization of one of the motors only when the other motor is deenergized.

8. A machine according to claim 1 including a first two-way switch in the path of a formed and advanced helical and operated by the end of said helical, a first motor operatively connected to the coilers and controlled by said switch, said switch also controlling the second motor hereinafter mentioned, a second motor, a clutch operatively connecting and disconnecting the second motor to and from the spring-advancing means, and a second two-way switch controlling the motors and leaving an operative connection to the clutch to deenergize the second motor when the clutch is disengaged and to energize the second motor when the clutch is engaged and the first switch has been operated by the helical.

9. In a machine for tying succeeding rows of coil springs together by means of helicals and operated automatically through a cycle of operations on each revolution of a drive shaft, a drive shaft, reciprocating means operatively connected to the drive shaft for advancing a row of springs into a tying position and for simultaneously advancing a previously tied row of springs, said means including a slotted guideway, means in the guideway for overlapping the corresponding end coils of corresponding springs in adjacent rows during the initial advance of the row, spring means for resisting the advance of the tied rows, means for forming and advancing helicals to wind the helicals around said end coils in said tying position and while the rows are at rest, slotted means operatively connected to the drive shaft for accurately shaping and holding the overlapping parts of at least one pair of said end coils in a predetermined position at the tying position prior to the formation of said helicals and for compensating for irregularities in said end coils, the row advancing means reciprocating in the slots of the guideway and of the slotted end coil shaping and holding means, and means operatively connected to the drive shaft for severing both ends of the helicals.

10. A machine for tying succeeding rows of coil springs by means of helicals wound around corresponding end coils of adjacent parts of corresponding springs in adjacent rows and having means operating through a cycle of operations in the following order; means first to sever simultaneously both ends of helicals formed and advanced during the previous cycle, means subsequently to release the helicals of the rows of springs tied during the previous cycle and held against advance with the rows, means thereafter to advance the rows of springs tied during previous cycles and simultaneously to advance a row of springs into a tying position wherein the springs are prepared for tying by the helicals, means operative thereafter to position adjacent parts of the end coils of the last advanced rows for the reception of the helicals, means for forming and advancing helicals and winding said helicals around adjacent parts of the corresponding end coils after the advance of the rows into the tying position has been completed, means for guiding and holding the helicals during the formation and advance thereof and until said guiding means is operated to release the helicals, and means for stopping the machine at the end of the cycle when the winding of the helicals around the end coils has been completed.

11. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, a fixed guide for the helical adjacent the shaping and positioning means, a movable guide having an open passage therethrough for the helical, said movable guide being movable into a position wherein the movable guide cooperates with the fixed guide to close said passage, means for moving the movable guide substantially vertically toward the fixed guide, and means for severing both ends of the helicals.

12. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, a first motor operatively connected to the helical forming and winding means, a second motor operatively connected to the row-advancing means, to the shaping and positioning means and to the helical severing means, an automatic switch for energizing one of the motors only when the other motor is deenergized, and manually operated means for energizing either of said motors when the other motor is deenergized.

13. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, a guide for overlapping the parts of the end coils as the springs are moved past the guide, and a guideway supporting the guide and adapted to have the springs inserted thereinto and moved therein into the tying position.

14. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, guides for the helicals comprising a fixed member and a movable member, having a passage therethrough for the helical and open along one side, said passage being closed by the fixed member during the winding of the helical, and means for withdrawing the movable member in a substantially vertical direction from the helical prior to the operation of the row-advancing means.

15. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, spring-pressed resistors movable with the springs advanced by the advancing means, and arranged to engage the parts of the end coils during the advance of the rows and to clamp said parts between the resistors and the advancing means and thereby to control the advance of the rows by the advancing means.

16. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, means carried by the shaping and positioning means to compress the springs to a predetermined height and thereby to arrange the end coils at a predetermined level in the tying position prior to the operation of the helical forming and winding means.

17. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, a guideway for receiving each of the springs of a row and for guiding the springs in the movement thereof to the tying position, means on the guideway for overlapping adjacent parts of corresponding end coils of the corresponding springs in adjacent rows on the insertion and advance of the springs in the guideway, and guides for the helicals comprising a fixed member and a cooperating vertically movable member having an open partly cylindrical smooth passage therethrough closeable by the fixed member, and means for withdrawing the movable member from the helicals prior to the operation of the advancing means.

18. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, spring-pressed resistors arranged to engage and to move as a unit with adjacent parts of the end coils during the advance of the rows and means to compress the springs at the tying position and thereby to arrange the end coils at respective predetermined levels said means including a vertically reciprocating member having a longitudinal slot therethrough for the passage of the helical and having an element thereon pressing vertically on an end coil.

19. In a machine of the character described, means for advancing a row of coil springs into a tying position wherein the corresponding end coils of the corresponding springs in adjacent rows are tied by a helical wound around adjacent parts of said end coils, means for shaping and positioning said parts to compensate for irregularities therein, means for forming and winding helicals around said parts, means for severing both ends of the helicals, guides for the helicals each comprising a fixed member and a vertically movable member having a partly cylindrical smooth passage therethrough and means for withdrawing the movable member from the helical to permit advance of the rows and means carried by the shaping and positioning means to compress the springs at the tying position and thereby to arrange the end coils at respective predetermined levels.

JOSEPH GAUCI.
DANIEL KRAKAUER.

REFERENCES CITED

The following references are of record in the file of this patent:

UNITED STATES PATENTS

| Number | Name | Date |
|---|---|---|
| 2,012,904 | Bowersox | Aug. 27, 1935 |
| 2,176,262 | Kirchner | Oct. 17, 1939 |
| 2,262,994 | Dickey | Nov. 18, 1941 |
| 2,330,244 | Saval | Sept. 28, 1943 |
| 2,388,106 | Woller | Oct. 30, 1945 |